United States Patent [19]

Jacobs

[11] Patent Number: 5,126,648
[45] Date of Patent: Jun. 30, 1992

[54] HIGH RESOLUTION PIGGYBACK LINEAR MOTOR DESIGN FOR PLACEMENT SYSTEMS AND THE LIKE

[75] Inventor: Fred Jacobs, New York, N.Y.
[73] Assignee: Megamation Incorporated, Lawrenceville, N.J.
[21] Appl. No.: 498,335
[22] Filed: Mar. 22, 1990
[51] Int. Cl.⁵ .............................................. G05B 1/06
[52] U.S. Cl. ................................. 318/640; 318/577; 318/603; 318/135; 318/687; 340/710
[58] Field of Search ................................. 318/560–687, 318/135; 340/710; 250/237 R

[56] References Cited

U.S. PATENT DOCUMENTS

| | | | |
|---|---|---|---|
| 3,786,332 | 1/1974 | Hepner et al. | 318/577 |
| 4,187,051 | 2/1980 | Kirsch et al. | 318/640 |
| 4,645,993 | 2/1987 | Naito et al. | 318/640 X |
| 4,654,571 | 3/1987 | Hinds | 318/687 |
| 4,823,062 | 4/1989 | Hoffman et al. | 318/687 |
| 4,890,241 | 12/1989 | Hoffman et al. | 901/8 X |
| 4,968,924 | 11/1990 | Mori et al. | 901/9 X |

Primary Examiner—Paul Ip
Attorney, Agent, or Firm—Louis Weinstein

[57] ABSTRACT

A positioning system for accurately positioning components and the like in which a two-dimensional linear motor moves upon an air bearing across a large platen having a predetermined grid pattern yielding reasonably good resolution. A second two-dimensional positioning assembly of extremely fine resolution is secured to the linear motor arranged to traverse the large platen. Location sensors are provided in closed loop feedback system for detecting the X and Y positions. Coarse resolution is obtained by operating the first two-dimensional linear motor and fine resolution is obtained by operating the second two-dimensional positioning assembly, preferably after disabling the air bearing. The fine positioning system may also include a driver motor for rotating a manipulator arranged upon the second positioning system to correct for any angular misalignment of the component being placed by the manipulator.

45 Claims, 9 Drawing Sheets

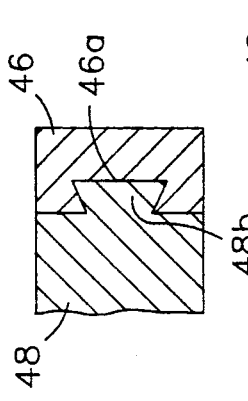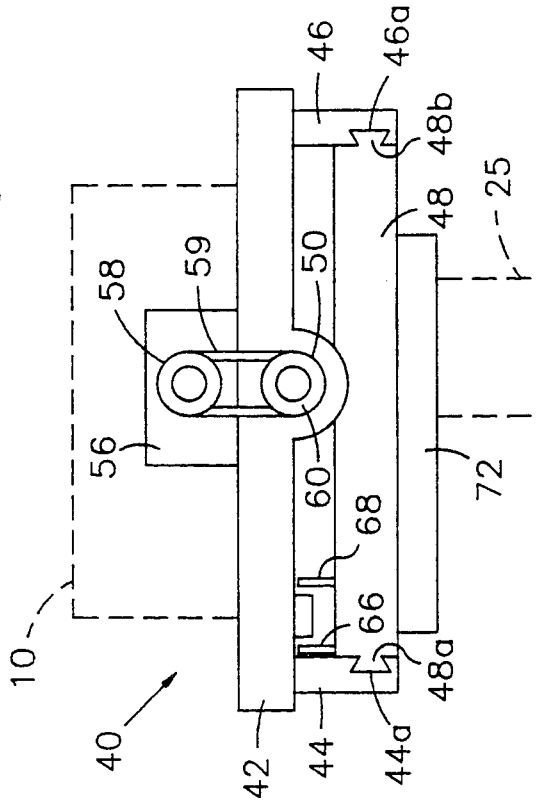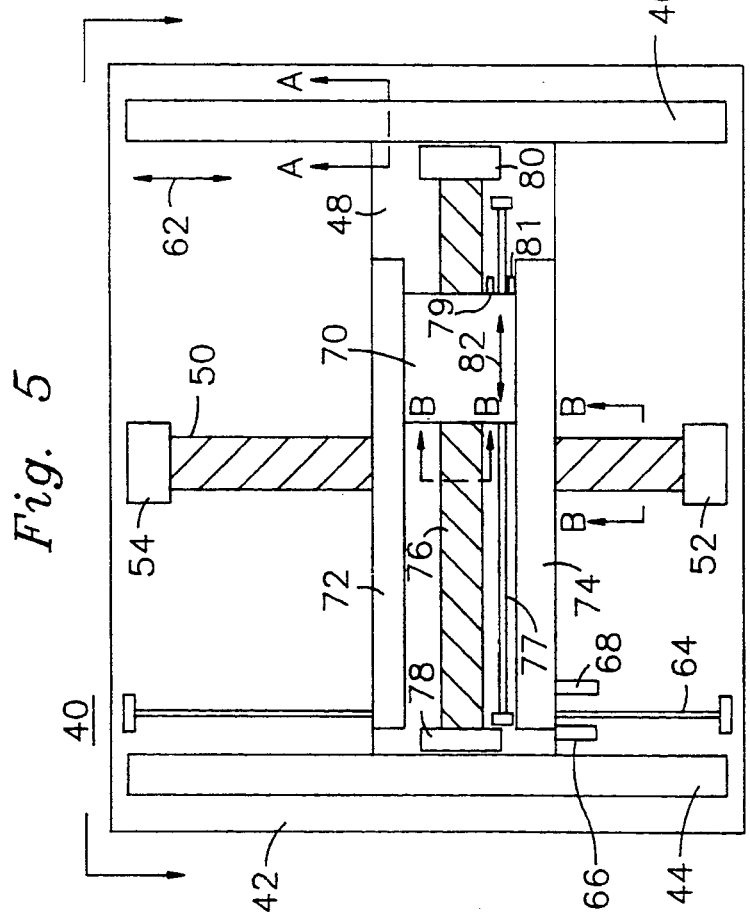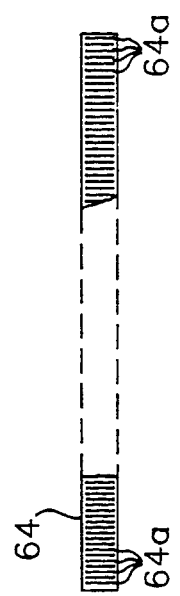

HIGH RESOLUTION PIGGYBACK LINEAR MOTOR DESIGN FOR PLACEMENT SYSTEMS AND THE LIKE

FIELD OF THE INVENTION

The present invention relates to a positioning system and, more particularly, to a method and apparatus for operating a high resolution placement system through the employment of a first two-dimensional positioning system for providing coarse resolution and a second two-dimensional positioning system of higher precision for obtaining very high resolution positioning.

BACKGROUND OF THE INVENTION

Linear motors are well known in the robotics art and are capable of being moved at relatively high speed across a cooperating surface referred to as a platen. Two-dimensional linear motors typically comprise first and second stepping motors for providing movement of the two-dimensional linear motor in mutually perpendicular directions, each stepping motor comprising a moving member or "forcer" for traversing the surface of a cooperating platen.

The forcer is magnetically propelled along the working surface of a platen. Two-dimensional forcers are described in detail in application Ser. No. 77,112, filed Jul. 23, 1987, now U.S. Pat. No. 4,823,062, issued Apr. 18, 1989 and assigned to the assignee of the present invention. The description of such forcers in the aforementioned patent are incorporated herein by reference thereto.

Magnetic propulsion is accomplished by selectively controlling the power provided to a plurality of electromagnets arranged within the two-dimensional forcer. The electromagnets magnetize themselves to teeth defined by a regular grid array machined into the working surface of the platen and comprised of a plurality of first and second groups of uniformly spaced parallel lines, which first and second groups of lines are mutually orthogonal to define a regular grid matrix. The grid array grooves are preferably filled with a suitable insulating material, the grooves being formed in the surface of a ferromagnetic material or alternatively of a material capable of concentrating magnetic lines of force. The platen with the grooves filled as set forth above thus presents a smooth continuous planar surface.

In order to move two-dimensional linear motors from one position to another with the positioning being precisely at the desired location, it is typical to provide a closed-loop system.

Such a closed-loop control system is described in U.S. Pat. No. 4,823,062 referred to hereinabove. The system described in U.S. Pat. No. 4,823,062 is provided with a platen having grid lines that are separated by distances of the order of 0.04 inches. Although it is possible to obtain finer resolution, it is necessary to accurately form such grid lines in the platen to achieve such resolution, thereby significantly increasing the cost and complexity of the platen. Also, linear motor assemblies do not lend themselves readily to accurate placement through the use of feedback systems.

The two-dimensional linear motor is typically utilized to position a robot arm which moves above a work region. One typical operation is the accurate placement of a microchip upon a printing wiring board with each lead of the chip being precisely placed upon a cooperating mounting solder pad or the like.

The normally encountered design tolerance of the platen coupled with the expansion and contraction of the platen due to changing temperature and climatic conditions, contribute to misalignment of such parts upon a supporting substrate.

The present invention contemplates a method and apparatus for avoiding such costs and complexities.

BRIEF DESCRIPTION OF THE INVENTION

The present invention is characterized by comprising a high resolution positioning system utilizing a conventional platen and a two-dimensional linear motor for obtaining "coarse" resolution and further being provided with a two-dimensional positioning means such as a conventional two-dimensional drive screw assembly or second two-dimensional linear motor which is arranged to move over a second platen of significantly reduced surface area as compared with the first-mentioned platen and having a grid pattern which is of significantly greater resolution than the grid pattern of the first-mentioned platen for obtaining "fine" resolution. The second platen is rigidly secured to the first-mentioned two-dimensional linear motor. The second two-dimensional linear motor may be smaller than the first-mentioned linear motor, if desired.

The high resolution platen is provided with location sensors which cooperate with the second two-dimensional linear motor to provide a closed-loop system. The control system operating the "coarse" linear motor need not be a closed-loop system.

The "coarse" and "fine" two-dimensional linear motors may be moved either simultaneously or in sequential fashion to obtain the coarse and fine resolution desired without the need for providing a large sized platen of extremely high resolution.

Both of the linear motors preferably move across the surface of their respective platens upon air bearings to facilitate high speed movement while significantly reducing wearing of the system components.

In order to further enclose the limited resolution of a linear motor assembly, as an alternative other types of two-dimensional drives may be employed to obtain the desired "fine" resolution, such as a two-dimensional drive screw assembly incorporating a positive feedback arrangement such as a two-dimensional drive screw assembly comprised of a support for slidably mounting and guiding a first platform movable, for example, in the $\pm X$ direction by a drive screw cooperating with a threaded member integral with the first platform. Means are provided for slidably mounting and guiding a second platform movable in the $\pm Y$ direction perpendicular to the movement of the first platform by a drive screw assembly.

The position of each of the assemblies is tracked by means such as a multi-slotted member, typically referred to as a "picket fence" provided with closely spaced parallel slits which may be created upon a plastic substrate by an etching or photographic technique. The "picket fence" is mounted upon the aforementioned support and the cooperating light source and light sensor are mounted upon the first platform and arranged on opposite sides of the picket fence for sensing the passage of transparent slits to precisely and accurately measure the movement of the first platform. A similar "picket fence" is mounted upon the first platform and a cooperating light source and light sensor are mounted upon the second platform on opposite sides of the second picket fence to detect the passage of transparent slits for precisely and accurately determining the movement of the second platform which moves in the direction perpendicular to the first platform.

The aforementioned support is secured to the two-dimensional linear motor described hereinabove. The two-dimensional linear motor cooperates with the etched or machined platen to control the "coarse" movement of the two-dimensional linear motor whereupon the air bearing for the two-dimensional linear motor is disabled to lock the two-dimensional linear motor in the desired "coarse" position whereupon the two-dimensional drive screw assembly is operated to move the first and second movable platforms to the desired "fine" location. The feedback means described hereinabove assure the appropriate positioning.

robot is mounted upon the second movable platform and is activated to perform an operation (such as placement, removal, soldering, screwing and/or other operations).

The second movable platform and platen are preferably parallel to one another. However, the second movable platform may be arranged at any angle other than parallel to the platen, by mounting the support of the two-dimensional drive screw assembly upon the two-dimensional linear motor so that it is oriented at any desired angle relative to the platen.

The resolution of the two-dimensional drive screw assembly is determined by the feedback system which may be a linear potentiometer, picket fence or other suitable feedback means. The two-dimensional drive screw assembly lends itself more readily to a high resolution feedback system than the linear motor assembly thus providing a significant improvement in the precision positioning of the robot.

Due to the fact that the "fine" positioning assembly is relatively small compared with the "coarse" positioning assembly, the system lends itself readily to the use of plural two-dimensional linear motors each having mounted thereon a two-dimensional "fine" positioning system, each being capable of being utilized substantially simultaneously through the employment of the anti-collision apparatus described, for example, in U.S. Pat. No. 4,823,062.

The positioning system may also accommodate any angular or rotational misalignment by providing an X, Y, $\theta$ positioning assembly which may be accomplished by rotatably mounting the robot arm and rotating the robot arm through a drive motor to correct for any angular misalignment.

Misalignment is preferably determined by a vision system comprised of a camera mounted upon the X, Y, $\theta$ positioning system. The two-dimensional linear motor assembly is initially operated to move the robot to the desired position. The two-dimensional linear motor assembly is turned off upon reaching the desired location. The air bearing is also preferably turned off to "lock" the two-dimensional linear motor positioning assembly at the desired location. The vision system camera maps a chip to be positioned upon the printed circuit board, locating its position on the printed circuit board and determining the correction (X, Y, $\theta$) required to accurately and precisely position the microchip. The correction values are utilized to move the high precision X, Y, $\theta$ positioning system, which is "piggybacked" upon the two-dimensional linear motor assembly to the desired final position, the high precision X, Y, $\theta$ positioning system thus providing the "fine" or correction movement of the robot.

OBJECTS OF THE INVENTION

It is, therefore, one object of the present invention to provide a novel high precision positioning system employing coarse and fine resolution two-dimensional positioning assemblies to achieve high precision positioning, the fine resolution two-dimensional positioning assembly being secured to the two-dimensional linear motor cooperating with the coarse platen, the fine resolution two-dimensional positioning assembly being a small fraction of the size of the coarse resolution two-dimensional positioning assembly.

Still another object of the present invention is to provide a novel high precision positioning system utilizing at least one two-dimensional linear motor of the type described herein Still another object of the present invention is to provide a novel high precision positioning system employing a "fine" two-dimensional positioning system "piggybacked" upon a coarse two-dimensional positioning system, wherein the "fine" positioning system includes positive feedback to precisely control the "fine" positioning.

Still another object of the present invention is to employ a positioning system of the type described wherein the coarse and fine positioning systems are of different types.

Still another object of the present invention is to provide a precision placement system and technique comprising a first placement assembly for moving an object, a camera system for determining the accuracy of the initial placement of the object and a second high precision X, Y, $\theta$ placement assembly for moving the object to the desired position thereby correcting for any misalignment of the object relative to the desired final position.

The above, as well as other objects of the present invention will become apparent when reading the accompanying description and drawings.

BRIEF DESCRIPTION OF THE FIGURES

FIG. 5 shows a plan view of an alternative two-dimensional drive assembly which may be "piggybacked" upon the two-dimensional linear motor shown in FIG. 2a which provides the "coarse" placement;

FIG. 5a shows a sectional view of a portion of the two-dimensional assembly of FIG. 5 looking in the direction of arrows A—A;

FIG. 5b shows an elevational view of two portions of the two-dimensional drive system of FIG. 5a;

FIG. 5c shows an elevational view of the two-dimensional drive system of FIG. 5; and FIG. 5d shows an elevational view partially sectionalized of the "picket fence" employed in the feedback systems in the two-dimensional positioning assembly of FIG. 5.

DETAILED DESCRIPTION OF THE INVENTION AND THE PREFERRED EMBODIMENTS THEREFOR

Figure 1:
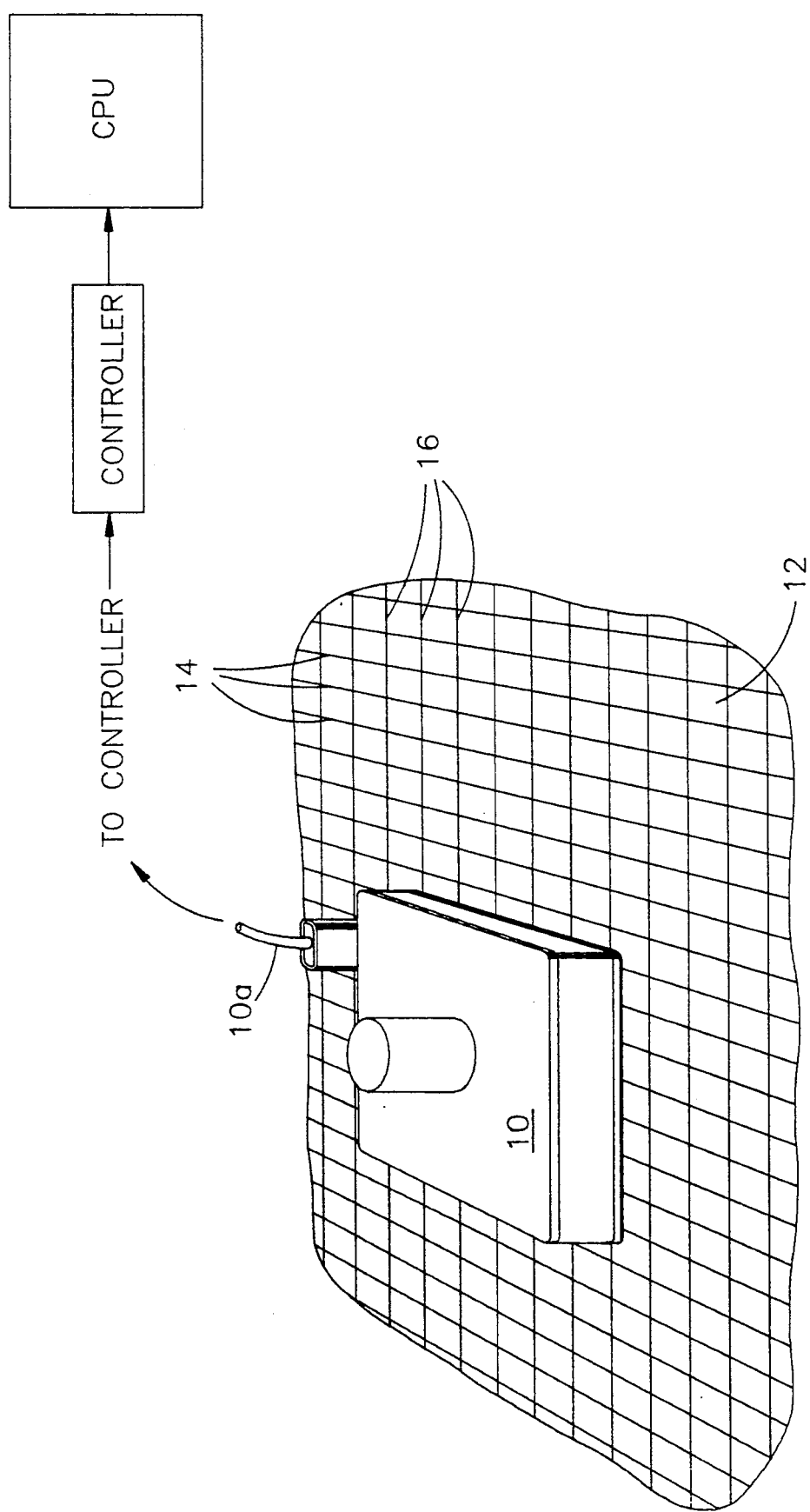
FIG. 1 shows a simplified view of a linear motor system which may be used in the novel high resolution positioning system of the present invention.
Figure 1A:
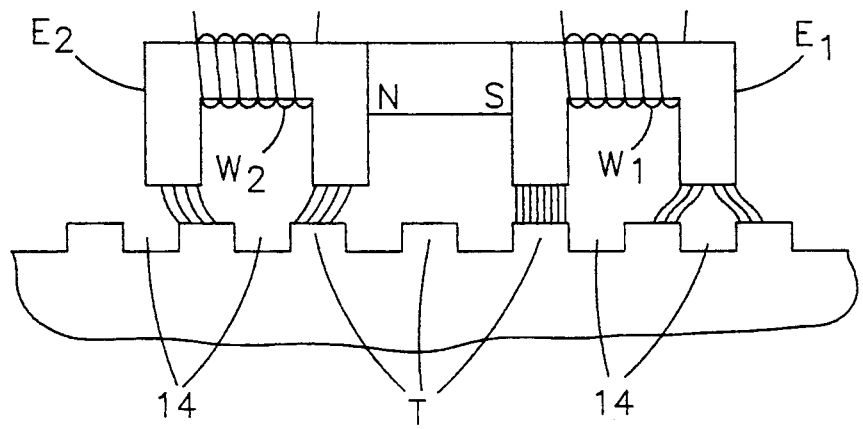
FIGS. 1a and 1b respectively show elevational and perspective views of details of the linear motor system of FIG. 1.

FIG. 1 shows a simplified perspective view of a linear motor 10 movable along platen 12 provided with mutually perpendicular sets of grid lines 14 and 16 formed in the platen surface for defining a regular matrix of rectangular-shaped (and preferably square-shaped) teeth T which cooperate with the mutually perpendicular forcers shown in FIG. 1a to move the linear motor along the surface of platen 12.

Figure 1B:
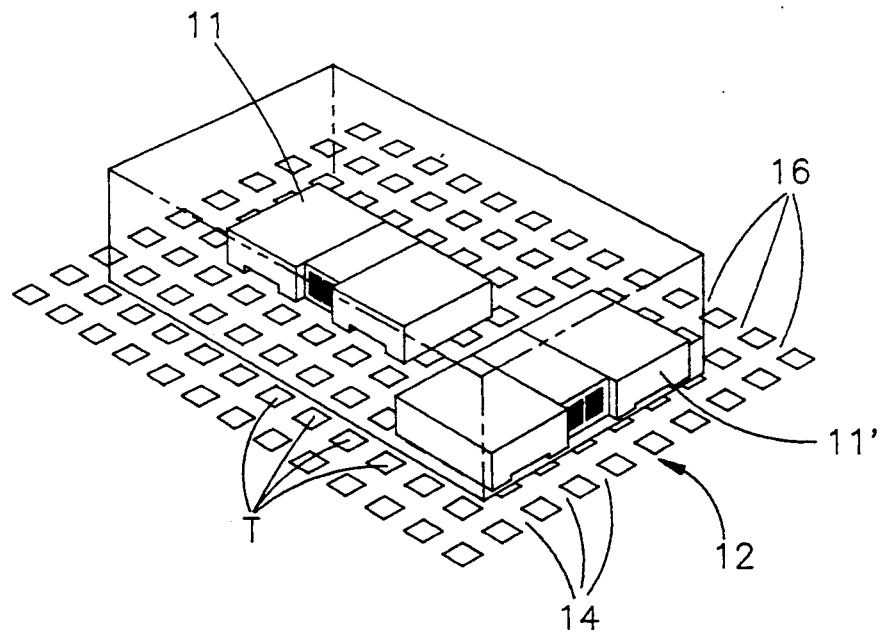

The forcers 11 and 11' shown in FIG. 1b are arranged in mutually perpendicular orientation and comprise electromagnets shown in FIG. 1a which receive sine wave currents that are out of phase with respect to one another and are applied to the windings W1 and W2 of electromagnets E1 and E2 of FIG. 1b. The phase difference is preferably a multiple of 90°.

Each forcer moves by one tooth pitch (typically 0.040 inches for each 360° angle of drive current). The current applied to each forcer is advanced or retarded in discrete steps, referred to as "micro" steps. Given that there are 400 micro steps per pitch, in one preferred embodiment, the motion is effectively continuous.

Frictionless operation is obtained through the use of an air bearing by way of air introduced through main umbilical cable 10a, together with the other electrical lines. The air flows out of tiny openings (not shown) along the bottom surface of the linear motor adjacent to the platen surface to form a film of air which allows the linear motor to "float" above the platen. Ball bearings may be utilized as an alternative to the air bearing, if desired.

Commands are provided to the forcers by the central computer (CPU—FIG. 4) and are provided in the form of position, velocity and acceleration data which is interpreted by the controller and relates to the drive electronics for conversion into analog signals The forcers 11 and 11' are arranged at right angles to each other and cooperate with the gridwork of teeth T to enable movement of the linear motor over a large platen surface and following any desired trajectory along the two-dimensional surface.

Figure 2A:
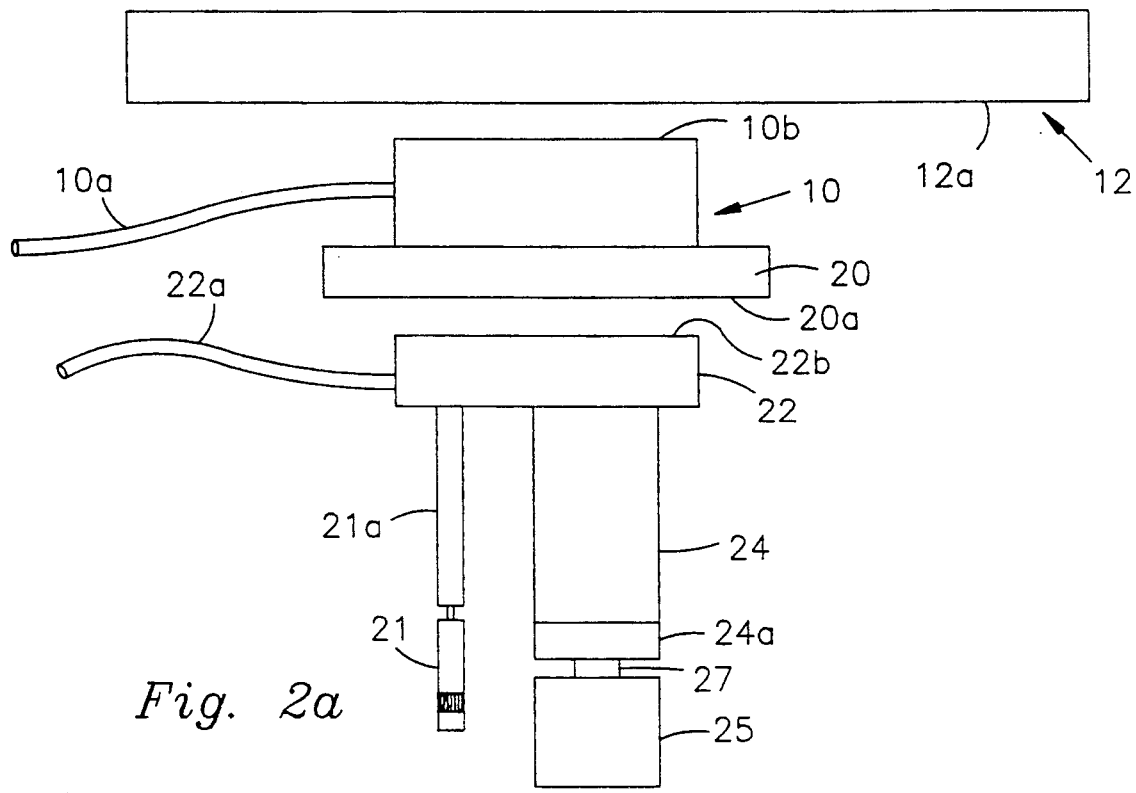
FIGS. 2a and 2b are elevation and bottom plan views of the present invention showing the "coarse" and "fine" platens and linear motors.

FIG. 2a shows an elevational view of the system of the present invention which is comprised of a large platen 12 similar to that shown in FIG. 1, for example. A two-dimensional linear motor 10, similar to the linear motor shown in FIG. 1, is adapted to move along the grid-like surface of platen 12. In the embodiment shown in FIG. 2a, the platen is horizontally aligned with the undersurface thereof carrying the grid pattern of teeth. This technique is utilized to great advantage in a robotic system described, for example, in U.S. Pat. No. 4,890,241, issued Dec. 26, 1989. The magnetic attraction between linear motor 10 and platen 12 is sufficient to retain the linear motor 10 in its proper operative relationship with the platen 12.

A second "small" platen 20 is fixedly secured to the underside of linear motor 10 and is provided along its bottom surface 20a with first and second sets of equispaced parallel linear grooves, said first and second sets of grooves being mutually perpendicular to one another to define a regular grid of teeth similar to the teeth T shown in FIG. 1. The general configuration of the grid is substantially the same as that shown for platen 12 of FIG. 1 with the exception that the grid lines and hence teeth are significantly smaller than the spacing of the grid lines and hence the size of the teeth T of platen 12. This arrangement is utilized to significantly increase the resolution capability of the system of the present invention.

A second two-dimensional linear motor 22 substantially similar to that shown in FIGS. 1–1b rides over the grid surface 20a of small platen 20, preferably by means of a suitable air bearing which is provided in the two-dimensional linear motor 10.

The magnetic attraction between small platen 20 and two-dimensional linear motor 22 is sufficient to maintain linear motor 22 in the operative position relative to small platen 20. Linear motors 10 and 22 are respectively provided with umbilical cords 10a, 22a which couple appropriate electrical power to the linear motors as well as providing a conduit for delivery of air to create an air bearing between the cooperating surfaces 10b, 12a and 22b, 20a.

When employing the system of the present invention in a robotics application, two-dimensional linear motor 22 may be fitted with a robotic arm 24 for high precision delivery of components as well as performance of activities upon a work surface positioned beneath robotic arm 24 and in spaced substantially parallel arrangement with platens 12 and 20. The arm may be releasably connected with tools, component gripping means and the like shown at 25 in block diagram fashion, by means of a coupling device 24a as shown, for example, in U.S. Pat. Nos. 4,867,595 and 4,823,062.

The linear motor 22 is preferably provided with forcers which are commensurate with the gridwork of teeth arranged along surface 20a of small platen 20 in order to obtain the significantly increased resolution.

Figure 3:
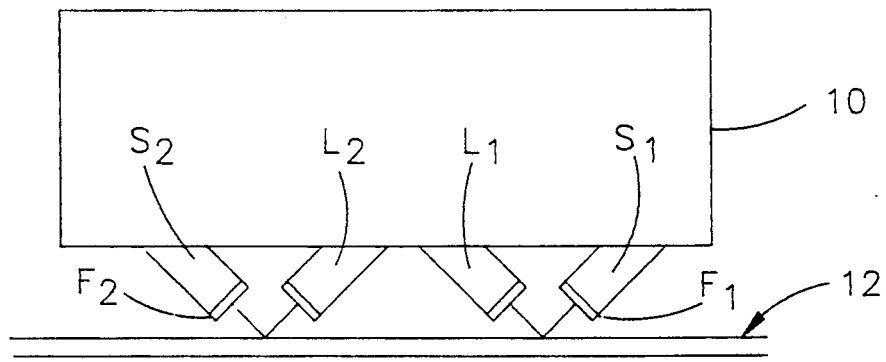
FIGS. 3 and 3a are elevation and bottom plan views of sensors for tracking movement of a linear motor.
Figure 3A:
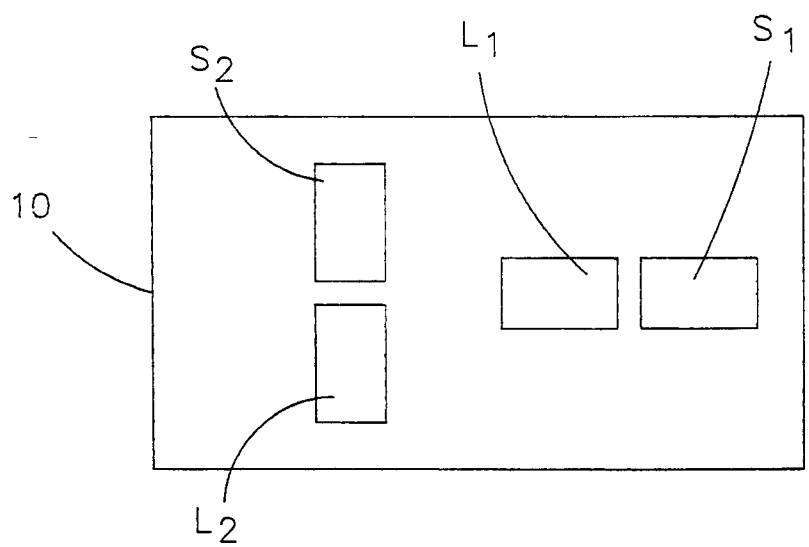

The linear motor 10 may be fitted with sensor devices as shown, for example, in FIGS. 3 and 3a. The sensor assemblies are arranged along surface 10b, for example, and each assembly is comprised of a light source L1, L2 and a cooperating sensor S1, S2. These combinations are arranged in mutually perpendicular fashion as shown in FIG. 3a.

The light from each source L1, L2 is reflected from the platen surface 12a and is picked up by an associated sensor S1, S2. The reflectivity of the teeth preferably differs from the reflectivity of the grid lines in order to generate signals representative of movement of the linear motor in each of the two mutually perpendicular directions. Each sensor may respectively be provided with a filter F1, F2 for filtering out light of all wavelengths except the wavelength which is passed by the filter in order to prevent one sensor assembly from erroneously detecting grid lines intended for detection by the other sensor assembly. For example, grid lines 14 (see FIG. 1) may be red, while grid line 16 may be blue, the filters F1 and F2 being respectively designed to pass only red and blue light. Other reflectivity techniques may be utilized.

A vision system comprising a camera having a lens 21 supported by bracket 21a on the underside of the X-Y motor 22, is utilized to observe the placement of the object being carried by the robot manipulator 25 in order to determine the accuracy of the placement. The camera is preferably of the charge-coupled-diode (CCD) type and may, for example, be a Model IK-M30M produced by Toshiba, said camera being employed in a Cognex 3400/DS vision system. The camera maps the item being placed upon the working surface which is typically a conveyor carrying printed circuit boards, locating the position of the object being positioned which may, for example, be a microchip. The camera and vision system determines the misalignment (if any) between the microchip being placed and the desired location on the printed wiring board, generating signals representative of X, Y and $\theta$ corrections which are necessary to obtain the appropriate alignment of the microchip upon the printed wiring board.

Figure 4:
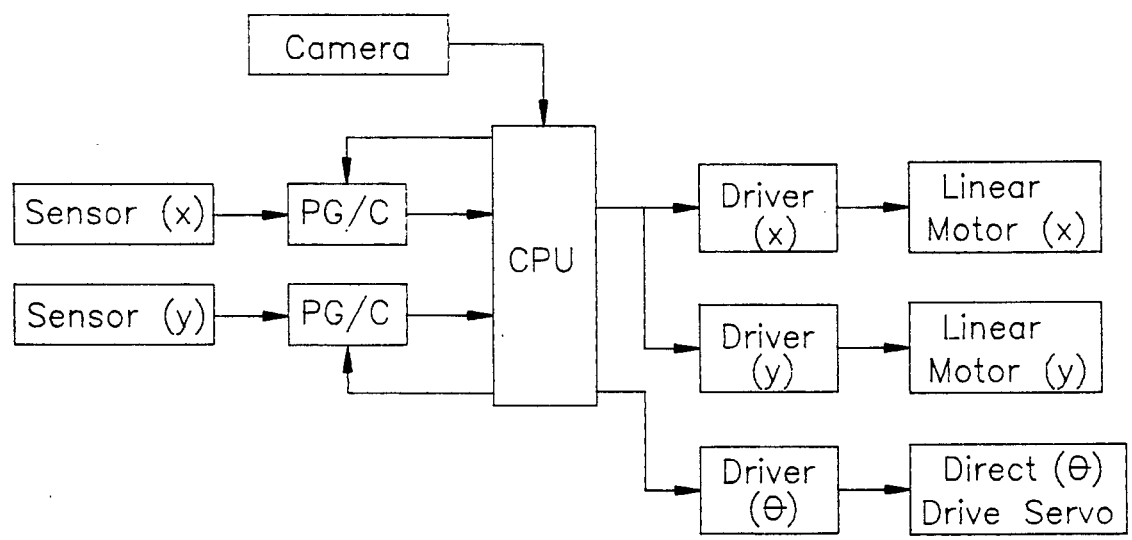
FIGS. 4, 4a and 4b are block diagrams of different systems for controlling the linear motors of FIG. 2, for example.

As shown in FIG. 4, a CPU drives each of the linear motors X and Y through driver circuits. The X and Y sensors apply their pulses to an associated pulse generator/counter circuit PG/C.

The CPU initially resets the counter circuits and then applies the driving signals for the X and Y directions to the X and Y drivers. The X and Y linear motors drive the two-dimensional linear motor across platen 12. The CPU inputs appropriate counts into the X and Y counters representative of the distance to be moved. The X and Y sensors apply pulses to the counters and when the counters are stepped down to zero, the CPU terminates driving of the X and Y linear motors.

If desired, the linear motor assembly 10 may be driven in an open-loop fashion. The umbilical 10a is of a length sufficient to enable the linear motor assembly 10 to move to any location over the entire working surface 12a of platen 12.

After the robot is positioned by the first linear motor assembly 10, the air under pressure creating the air bearing is turned off, locking the linear motor 10 to the platen 12. The camera 21 maps the component which may, for example, be a microchip, as it is positioned above a printed circuit board, for example, to determine the accurate positioning and orientation of the microchip relative to the associated pattern upon the printed circuit board. Any misalignment is corrected by providing X, Y and $\theta$ signals from the CPU to the respective X, Y and $\theta$ drivers which operate the X and Y linear motors and the direct drive servo-motor for an angular correction, if necessary. The servo-motor may form part of the robot manipulator 25 shown, for example, in FIG. 2a which is adapted to rotate the component (not shown for purposes of simplicity) being held by the manipulator to the appropriate angular orientation, if and when necessary.

Figure 2B:
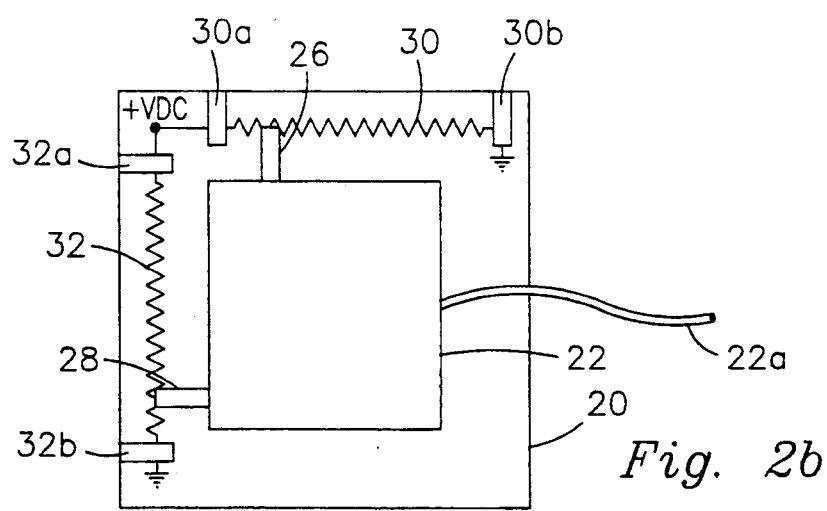

The two-dimensional linear motor 22 moves over a significantly smaller working surface 20a of platen 20 and preferably employs a closed-loop technique which may be the same as the light source/light sensor arrangement shown in FIGS. 3 and 3a or alternatively may, for example, be a linear potentiometer technique. Noting FIG. 2b, for example, two-dimensional linear motor 22 is provided with a pair of electrodes 26, 28 which slidably engage the resistive patterns 30, 32 of a linear potentiometer. The ends of linear potentiometer 30 are coupled to +VDC through end electrode 30a and ground potential through end electrode 30b. Similarly, contact 28 slidably engages the resistive pattern 32 of a second linear potentiometer whose end terminals 32a, 32b respectively are coupled to +VDC and ground potential.

Figure 4A:
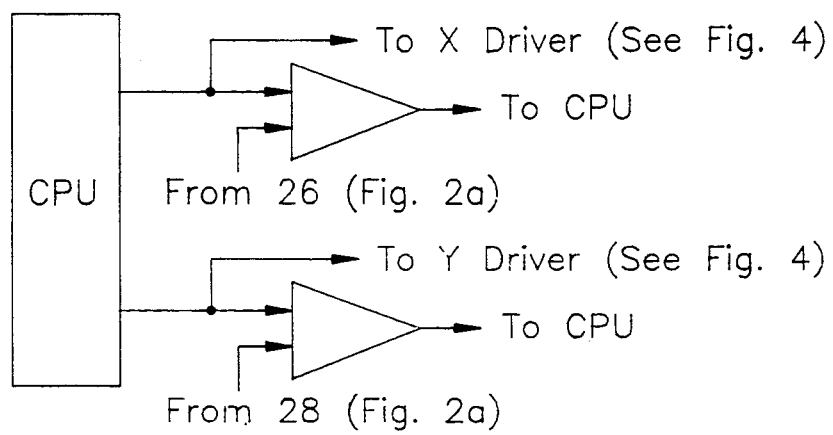

The embodiment of FIG. 4 may be modified as shown in FIG. 4a wherein the CPU respectively applies analog voltages to each of the X and Y comparators representative of the distance to be travelled by linear motor assembly 22 in the X and Y directions. The CPU applies analog signals to the X and Y drivers for driving the X and Y linear motors across platen 20. Conductors 26 and 28 develop a DC voltage level between +VDC and ground potential representative of the spacing between the end terminals 30a, 30b and 32a, 32b. These signals are coupled to the X and Y comparators through the umbilical cord 22a. When these signals compare, the X and Y comparators cause the CPU to terminate the application of driving signals to the linear motors.

Figure 4B:
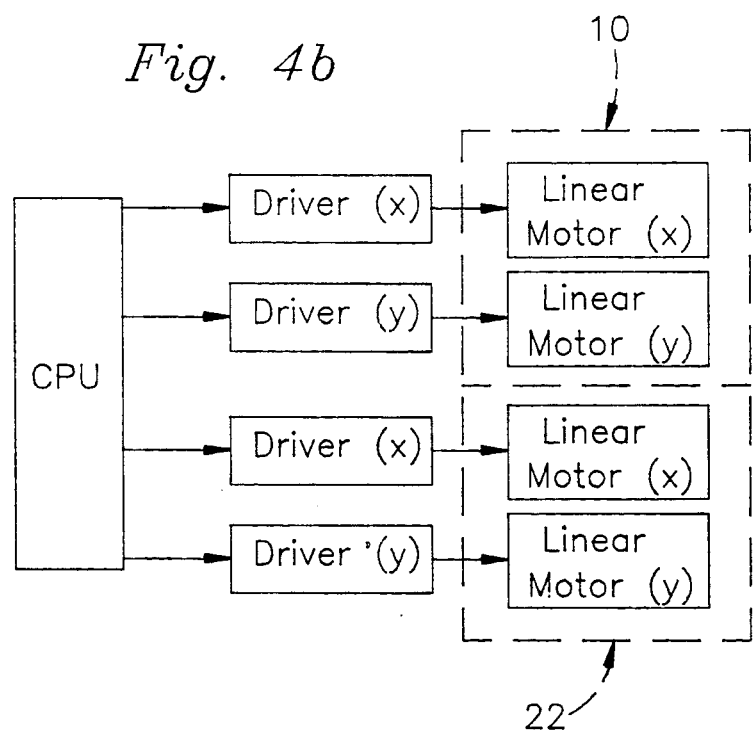

FIG. 4b shows an arrangement in which the CPU drives the X and Y linear motors of linear motor assembly 10 and the X and Y linear motors of linear motor assembly 22.

If desired, the linear motors 10 and 22 may be moved simultaneously or alternatively, linear motor 10 may be moved first and thereafter linear motor 22 may be moved to obtain the coarse and fine movement respectively thereby positioning linear motor 22 with great precision.

If desired, when operating the linear motors 10 and 22 in sequential fashion, the air pressure applied to linear motor 10 may be terminated during the movement of linear motor 22 to remove the air bearing and thereby "lock" the linear motor 10 to platen 12.

The flow diagrams for moving each of the X and Y linear motors of each assembly 10 and 22 may, for example, utilize the arrangement shown in FIG. 5 of U.S. Pat. No. 4,823,062 and the disclosure therein is incorporated herein by reference thereto.

The two-dimensional precision drive system comprised of small platen 20 and X-Y motor 22 may be replaced with the two-dimensional positioning system 40 shown in FIGS. 5-5d and comprised of a main support 42 for physical securement to the two-dimensional linear motor 10, shown in dotted fashion in FIG. 5c. Support 42 is provided with a pair of guides 44, 46 each having a dovetail groove such as, for example, the dovetail groove 46a shown in FIG. 5a.

An elongated first platform 48 is arranged between guides 44 and 46 and is provided at opposite ends thereof with dovetail-shaped projections 48a, 48b, shown in FIGS. 5a and 5c which are slidably received within the dovetail-shaped recesses 46a, 44a.

A lead screw 50 is rotatably mounted in a free-wheeling manner within a bearing 52 provided at one end thereof and a second bearing 54 provided at the opposite end thereof. Lead screw 50 is rotatable by means of a bi-directional motor 56 which may, for example, be mounted on the opposite side of main support 42 and near one end thereof so as to be displaced from the two-dimensional linear motor 10. The motor output shaft may be provided with a timing belt pulley 58. A timing belt 59 is entrained about pulley 58 and a pulley 60 provided at the end of lead screw 50 arranged within bearing 54.

The first platform 48 is provided with a threaded opening 48c which receives lead screw 50 and cooperates with the lead screw to linearly move first platform 48 in one of the two directions shown by the double-headed arrow 62, according to the rotational direction of lead screw 50.

The position occupied by first platform 48 within the extreme end points of its movement is determined by a vertically aligned registration strip or "picket fence" 64 shown in elevational view in FIG. 5d as being provided with a plurality of transparent slits 64a arranged in closely spaced parallel fashion. The first movable platform 48 is provided with a light source 66 and cooperating light sensor 68 extending downwardly from platform 48 and arranged on opposite sides of registration strip 64 for detecting pulses of light passing through each registration slit 64a from light source 66 as the platform 48 moves in one direction or the other. The computer program is preferably designed to move first platform 48 in a first direction in order to establish a starting position. Alternatively, the last position occupied by platform 48 may be stored within a memory register and, according to the direction of rotation of lead screw 50 the pulses of light sensed by light sensor 68 are either added to or subtracted from such count. Registration strip 64 is preferably formed in a highly precision manner with very closely spaced transparent slits to provide extremely high resolution in order to position the robot manipulator 25 mounted upon the second movable platform 70 in a highly precise manner. The pulses sensed by light sensor 68 are electrically coupled to the memory register PG/C, for example, shown in FIG. 4 which in turn couples the count to the CPU, the motor 56 being coupled to the CPU through the appropriate driver shown in FIG. 4, whose output is coupled to motor 56 in place of the linear motor shown in FIG. 4.

The first movable platform 48 is provided with a pair of guides 72 and 74 substantially similar to guides 44 and 46 and each being provided with a similar dovetail-shaped groove such as, for example, the groove 46a shown in FIG. 5a. The second movable platform 70 is slidably moved between said guides and is provided at opposite parallel ends with dovetail-shaped projections similar to the dovetail-shaped projections 48a, 48b shown in FIG. 5a which are slidably received within their associated dovetail-shaped grooves in the guides 72 and 74.

A second lead screw 76 is free-wheelingly mounted at one end within bearing 78 and at the opposite end may be directly coupled to bi-directional motor 80. Lead screw 70 extends through a threaded bore integral with second integral platform 70 and is similar to the arrangement shown in FIG. 5b. The direction of rotation of lead screw 76 controls the direction of movement of second movable platform 70.

A vertically aligned registration strip 77, similar to registration strip 64 cooperates with light source 81 and light sensor 79 extending downwardly from platform 70 to generate electrical pulses representing the light pulses sensed by light sensor 79 as the second movable platform moves in one of two linear directions as shown by the double-headed arrow 82. The electrical pulses are connected to the appropriate register PG/C for coupling to the CPU which in turn drives motor 80.

The drive means employed for the two-dimensional drive system shown, for example, in FIG. 5 may take a variety of forms. Note, for example, the alternative two-dimensional drive system 40' shown in FIG. 6 in which like elements have been designated by like numerals which, however, have been primed.

Figure 6:
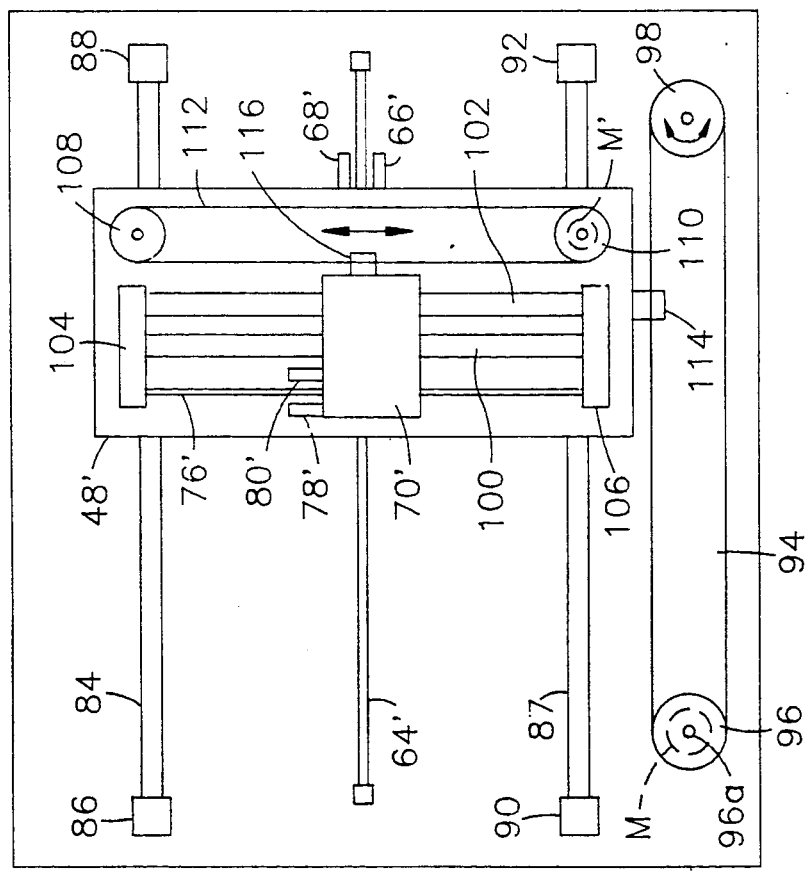
FIG. 6 is a plan view of another precision two-dimensional positioning system useful in the present invention.

The guides 44 and 46 of FIG. 5 are replaced in FIG. 6 by elongated rods 84, 87 which extend through cooperating integral openings (not shown) within platform 48' and which may be similar to the opening 60 shown in FIG. 5b with the exception that the opening is smooth and not threaded. Rods 84 and 87 may be of any suitable cross-section such as circular, elliptical, square, rectangular, polygonal or the like and are supported upon main support 42' by end supports 86, 88, 90 and 92 respectively. Lead screw 50 is replaced by a closed loop timing belt 94 entrained about timing pulleys 96, 98, one of which is driven by a bi-directional drive motor M coupled, for example, to the shaft 96a of pulley 96. Registration strip 64', light source 66' and light sensor 68' are substantially the same as the elements 64, 66 and 68 shown in FIG. 5.

The second movable platform 70 is supported by a pair of similar guide rods 100, 102 extending through suitable bores provided within movable platform 70, the ends of guide rods 100, 102 being arranged within end supports 104, 106. A drive arrangement similar to that o utilized to drive platform 48' is comprised of a timing belt 112 entrained about timing pulleys 108, 110, the bi-directional motor M' utilized to drive the system being coupled, for example, to shaft 110a of timing pulley 110.

Registration strip 76', light source 78' and light sensor 80' are substantially similar to the registration strip 76, light source 78 and light sensor 80 shown in FIG. 5.

Platform 48' is clamped to timing belt pulley 94 by suitable clamping means 114 while platform 70' is clamped to timing belt pulley 112 by clamping means 116.

The two-dimensional positioning system shown in FIG. 6 operates in a manner substantially similar to that of the system 40 shown in FIG. 5. Any other type of drive system or feedback system may be utilized. For example, the linear potentiometer system employed in the embodiment of FIG. 2b may be utilized in the embodiments of FIGS. 5 or 6.

As another alternative, encoder disks may be coupled to the shafts of one of the timing pulleys, for example, the timing pulleys 96 and 110 shown in FIG. 6, in place of the registration strips 64' and 76'. Suitable sensing devices may be utilized to detect the patterns on the encoder strips whereby the count of slits or other indicia provided upon the encoder strips by suitable light source and cooperating sensing means utilized to generate pulses representative of linear movement of the cooperating movable platforms.

Figure 7:
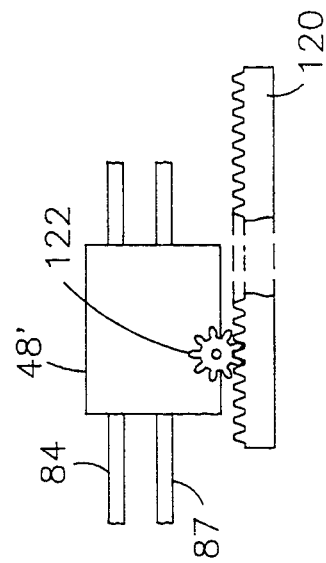
FIG. 7 is an elevational view of still another positioning technique useful in the present invention.

As another alternative, the drive systems shown in FIGS. 5 and 6 may be replaced by a rack-and-pinion drive system wherein an elongated rack is mounted in a stationary fashion and a motor driven pinion is provided upon each platform whereupon rotation of the pinion, which meshes with the teeth of a cooperating elongated rack, imparts the desired linear movement. Note, for example, FIG. 7 which shows movable platform 48' guided by rods 84, 87 and having a motor driven pinion 122 mounted thereon for meshing engagement with the teeth of rack 120, platform 48' being guided by guide rods 84 and 87. A similar rack-and-pinion arrangement may be provided for moving the second movable platform, the second rack being mounted upon platform 48' in a manner similar to that shown in FIG. 6, for example, and the second pinion being mounted to rotate upon second platform 70' and being adapted to make meshing engagement with the teeth of a second rack mounted upon the second platform.

Any other slide means having similar capabilities may be utilized, if desired.

Figure 8:
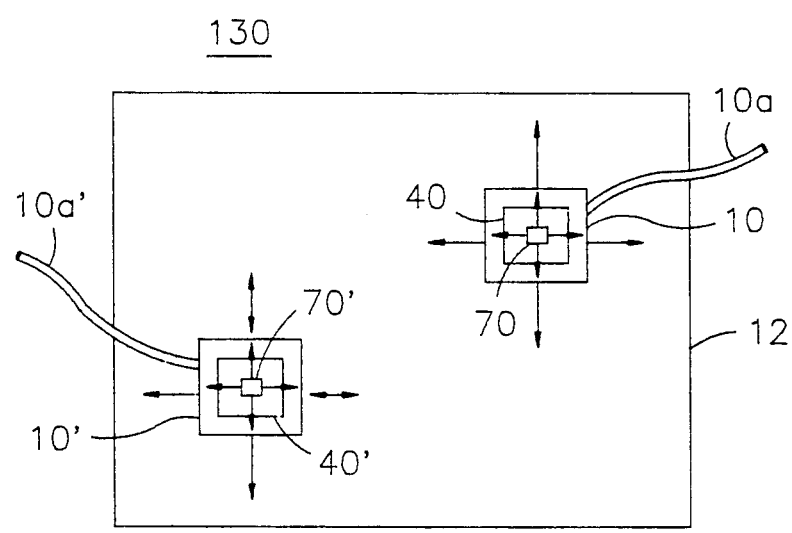
FIG. 8 is a simplified plan view showing the technique of the present invention employed in a multiple robot system.

FIG. 8 shows a simplified block diagram of a multiple robot system utilizing the positioning technique of the present invention and being comprised of a common platen 12 similar to platen 12 shown in FIG. 2a. First and second linear motors 10 and 10' are each arranged to move in mutually perpendicular directions about the working surface of platen 12. First and second two-dimensional positioning systems 40, 40' are respectively mounted upon each of the linear motors 10, 10', a robot (not shown for purposes of simplicity) being mounted upon the second movable platform 70, 70' of the two-dimensional positioning assemblies 40, 40'. Control signals and feedback signals are imparted to and derived from the assemblies 10–40, 10'–40' by the umbilicals 10a, 10a'. Collisions between the drives 10, 10' are prevented by use of the anti-collision techniques described in applicant's issued U.S. Pat. No. 4,890,241, granted Dec. 26, 1989. The robot manipulators may be provided with a servo-motor for rotating the manipulators, as shown in FIG. 2. A vision system as shown in FIG. 2 may be mounted upon each system 40, 40' adjacent to its associated robot manipulator to view the component being positioned relative to the substrate upon which the component is to be mounted. Any detected misalignment is corrected by presenting X, Y and $\theta$ signals to the precision X, Y and $\theta$ positioning assemblies 40, 40' to properly align the component relative to the substrate before release and placement of the component upon the substrate.

It can be seen from the foregoing description that the present invention provides a novel arrangement in which extremely high resolution placement obtained without the need for providing a linear motor system having a large platen with grid lines of extremely close spacing to obtain the desired high resolution, which technique utilizes a large platen having grid lines sufficient to control coarse positioning of the linear motor assembly which is comprised of first and second two-dimensional linear motors wherein the linear motor cooperates with the large platen and a second two-dimensional drive system is fixedly secured to the first-mentioned linear motor. As an example, the large platen typically has a working surface of the order of 50"×30" while a fine two-dimensional drive system has a working surface of the order of 5"×5", thus significantly reducing the complexity and cost of both the coarse and fine two-dimensional drive systems. The system of the present invention also automatically compensates for any placement error resulting from the linear motor system.

The technique of the present invention can provide resolution of the order of much better than forty thousandths of an inch.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A high precision placement system comprising:
    first mounting means including first reference surface means;
    first two-dimensional positioning means movable along said first reference surface means for positioning said first positioning means in a coarse manner relative to said first reference surface means;
    second mounting means including second reference surface means, mounted upon said first two-dimensional positioning means;
    second two-dimensional positioning means movable relative to said second reference surface means for positioning said second positioning means relative to said second reference surface means and hence relative to said first reference surface means, said second two-dimensional positioning means having a higher resolution than said first two-dimensional positioning means.

2. The system of claim 1 wherein said first first reference surface means comprises a platen having a planar working surface and first and second sets of parallel, uniformly spaced grid-like grooves lines formed in the platen working surface for defining an orthogonal matrix of teeth;
    said first positioning means comprising first two-dimensional linear motor means having first and second forcer means arranged adjacent to said platen; and
    means for operating said first and second forcer means to move said first linear motor means in mutually perpendicular directions over the planar surface of said platen.

3. The system of claim 2 wherein said second reference surface means is mounted upon said linear motor;
    said second two-dimensional positioning means comprising a second linear motor means;
    said second reference surface means having a planar working surface and first and second sets of parallel, uniformly spaced grid-like groove lines formed in the last-mentioned planar surface for defining an orthogonal matrix of teeth, the spacing between the parallel lines of said first and second sets of second platen being smaller than the spacing between the parallel lines of said first and second sets of said first platen;
    said second two-dimensional linear motor means having first and second forcer means;
    means for operating first and second forcer means of said second linear motor means for moving said linear motor means across the working surface of said second platen, whereby the collective movement of said first and second linear motor means respectively provides coarse and fine placement adjustment of said second linear motor means.

4. The system of claim 3 wherein the size of the working surface of said second platen is less than the size of the working surface of said first platen.

5. The system of claim 3 wherein the spacing between the lines of said first and second sets of said second platen is less than one-half the spacing between the lines of the first and second sets of grid lines of said first platen.

6. The system of claim 3 wherein the second platen working surface area is less than one-half the size of the working surface of said first platen.

7. The system of claim 1 further comprising means for generating signals representative of the distance and direction for movement of said first and second linear motor means.

8. The system of claim 7 further comprising means responsive to the movement of said first and second linear motor means for terminating movement of said first and second linear motor means when they have moved through a desired distance.

9. The system of claim 3 further comprising potentiometer means for sensing movement of said second linear motor means; and means responsive to the output of said potentiometer means for terminating movement of said second linear motor means when the values sensed by said potentiometer means is substantially equal to predetermined values representative of the distance to be moved by said second linear motor means.

10. The system of claim 9 wherein said potentiometer means comprises first and second resistance means;

means slidingly engaging each of said first and second resistance means for generating signals representative of the respective X and Y movement of said second linear motor means for determining the movement thereof.

11. The system of claim 10 wherein said potentiometer means comprises a linear resistance potentiometer having end terminals coupled between a predetermined voltage and ground potential.

12. The system of claim 11 wherein said resistance means are arranged in mutually perpendicular directions on the surface of said second platen adjacent associated sides of the grid pattern provided on said surface.

13. The system of claim 12 wherein said sensor means comprise conductive means slidably engaging said X and Y resistance members.

14. The system of claim 9 wherein said means responsive to the output of said potentiometer means comprises means for comparing the output of said potentiometer means with said predetermined value and means for terminating movement of said second linear motor means when the comparing means indicated that the inputs thereto are substantially equal.

15. The system of claim 13 further comprising an umbilical cord for coupling electrical signals to and from said second linear motor means;

said umbilical cord including conductor means for coupling the signals from said sensor means to said comparison means for determining the distance travelled by said second linear motor means.

16. The system of claim 15 wherein said umbilical cord further comprises means for delivering air under pressure to said second linear motor means for producing a film of air between the adjacent surfaces of said second linear motor means and said platen working surface to facilitate high speed, low friction movement of said second linear motor means across the working surface of said second platen.

17. The system of claim 1 further comprising a robot arm coupled to said second positioning means;

a work surface beneath said robot arm;

said robot arm including means for performing an activity upon said work surface and at a precise location thereupon.

18. The system of claim 7 wherein said first linear motor means is comprised of sensor means for sensing movement of said first linear motor means across said first platen;

means responsive to predetermined values for terminating movement of said first linear motor means when the signals developed by said sensor means compare with predetermined values.

19. The system of claim 18 wherein said sensor means comprises means for detecting the grid lines in said first platen.

20. The system of claim 3 wherein said first platen is horizontally aligned and said first platen working surface is on the underside of said horizontally aligned first platen;

said first linear motor extending downwardly from the working surface of said first platen, the magnetic attraction therebetween being sufficient to maintain said first linear motor means in operating relationship with said first platen.

21. The system of claim 20 wherein said second platen is mounted on the side of said first linear motor means remote from said first platen working surface;

the working surface of said second platen being on the underside thereof;

the working surfaces of said first and second platens being arranged in substantially spaced parallel fashion;

said second linear motor means being suspended beneath said second platen and extending downwardly therefrom, the magnetic attraction between said second platen working surface and said second linear motor means being sufficient to maintain the second linear motor means in working engagement with said second platen.

22. The system of claim 21 further comprising a second robot arm releasably mounted to said second linear motor means.

23. The system of claim 22 wherein said second robot arm comprises means for releasably supporting a component;

a work surface arranged beneath said second robot arm; and means provided on said second robot arm for viewing a component gripped by said delivery means for accurately positioning a component so gripped by said gripping means upon said work surface.

24. The system of claim 20 further comprising a work surface beneath said robot arm, wherein said robot arm further comprises means for performing an operating function at a predetermined location upon said work surface.

25. The system of claim 2 further comprising a first movable platform;

guide means on said second reference surface means for guiding and supporting said first movable platform to limit said first movable platform to linear movement at a predetermined orientation along said second reference surface means;

means mounted on said second reference surface means for driving said first movable platform;

a second movable platform positioned upon said first movable platform;

means on said first movable platform for guiding said second movable platform and limiting the movement of said second movable platform to linear movement at a predetermined orientation substantially perpendicular to the linear movement of said first movable platform;

second means for moving said second movable platform; and means for sensing the position of said first and second movable platforms.

26. The system of claim 25 wherein said means for detecting the position of said second movable platform in two-dimensional space further comprises:

means responsive to movement of said second movable platform relative to said first movable platform for generating a signal representative of said movement; and means responsive to movement of said first movable platform relative to said first mounting means for generating a signal representative of said last-mentioned movement.

27. The system of claim 26 wherein said means for generating a signal representative of the movement of said second movable platform and said first movable platform each comprise linear potentiometer means.

28. The system of claim 26 wherein said means for generating a signal representative of the movement of said second movable platform and said first movable platform each comprise a registration strip and a cooperating light source and light sensing means for sensing transparent slits in said registration strip upon movement of the associated platform.

29. The system of claim 25 wherein said means for driving said first and second movable platforms are each comprised of a lead screw and means for rotating said lead screw in either one of two rotational directions and a threaded opening provided in each of said first and second movable platforms for engaging its associated lead screw whereby rotation of each of said lead screw imparts linear movement to its associated movable platform.

30. The system of claim 25 wherein the means for driving said first and second movable platforms are each comprised of a closed-loop timing belt entrained about a pair of spaced timing belt pulleys;

means for selectively rotating one of said timing belt pulleys in either one of two rotational directions;
one run of each of said timing belts being positioned adjacent the path of movement of its associated movable platform and means for securing each movable platform to its associated timing belt whereby rotational drive imparted to the associated timing belt pulley of each of said drive means imparts linear movement to the associated movable platform.

31. The system of claim 25 wherein each of said guide means is comprised of a pair of spaced parallel guide rods cooperating with guide bores in each of said platforms for slidably receiving and being guided by an associated set of said guide rods.

32. The system of claim 25 wherein each of said guide means comprises a pair of elongated guide members each having elongated grooves;

each of said movable platforms having projections parallel to one another and arranged to be received by and slidably moved along the guide grooves in said guide members.

33. The system of claim 25 further comprising control means for applying signals to the drive means of said second two-dimensional positioning means;

said control means further including means for receiving positioning signals from said feedback means;

said control means generating control signals responsive to the feedback signals received from said position detecting means.

34. The system of claim 1 further comprising a robot mounted upon said second movable platform means of said second two-dimensional positioning assembly for performing an operation at the precise position to which the robot is moved by said coarse and fine two-dimensional positioning assemblies.

35. A high precision placement system comprising:

a platen having a planar working surface, and first and second sets of parallel uniformly spaced grid-like groove lines formed in the platen surface for defining an orthogonal matrix of teeth;

first and second two-dimensional linear motor means each having first and second forcer means and means for operating said first and second forcer means to move said first and second two-dimensional linear motor means over the planar working surface of said platen;

third and fourth two-dimensional positioning means each respectively mounted upon said first and second two-dimensional linear motor means; and means for moving said first, second, third and fourth two-dimensional positioning means for precision positioning thereof, the resolution of said third and fourth positioning means being greater than the resolution of said first and second positioning means.

36. A method for precision positioning of an object mounted upon an output platform movable by means of a two-dimensional positioning means which in turn is mounted upon the intermediate output platform of a second two-dimensional positioning means arranged to move relative to a work surface, comprising the steps of:

operating the second two-dimensional positioning means to move both the first and the second two-dimensional positioning means to a predetermined location; and operating the first two-dimensional positioning means to position the output platform at the desired final location, the resolution of the first positioning means being greater than the resolution of the second positioning means.

37. The method of claim 36 further comprising the steps of determining the instantaneous position of the output platform and operating said two-dimensional positioning means according to the detected position.

38. The method of claim 36 wherein said second two-dimensional positioning means comprises a platen and a two-dimensional linear motor movable in mutually perpendicular directions along the working surface of said platen, said two-dimensional linear motor having first and second forcer means, said method further comprising the step of operating said second two-dimensional positioning means further comprising the step of operating said first and second forcer means to selectively move said linear motor in mutually perpendicular directions to the desired position along the working surface of said platen.

39. The method of claim 38 further comprising means for generating an air bearing between said linear motor and the working surface of said platen, said method further comprising the steps of:

deactivating said air bearing generating means when said second two-dimensional positioning means has been moved to the desired position thereby locking the linear motor to the platen by magnetic attraction preparatory to operation of said first two-dimensional positioning means.

40. A precision placement system comprising:
first mounting means;
reference means;

first positioning means for moving said first mounting means relative to said reference means in mutually perpendicular directions along substantially common plane;

second mounting means;

second positioning means mounted upon said first mounting means for moving said second mounting means in mutually perpendicular directions substantially along a second common plane, said second positioning means having a higher resolution than said first positioning means;

said second positioning means further comprising means for rotating said second mounting means about a predetermined axis.

41. A precision placement system comprising:

first mounting means;

reference means;

first positioning means for moving said first mounting means relative to said reference means in mutually perpendicular directions along substantially common plane;

second mounting means;

second positioning means mounted upon said first mounting means for moving said second mounting means in mutually perpendicular directions substantially along a second common plane, said second positioning means having a higher resolution than said first positioning means;

said second positioning means further comprising means for rotating said second mounting means about a predetermined axis;

holding means on said second mounting means for holding a component for delivery of said component to a working surface adjacent to said holding means; and camera means mounted upon said second mounting means for mapping the position of said component relative to said working surface, including means for generating signals for operating said second positioning means in the event of misalignment between said components and said working surface.

42. A method for precision positioning of an object releasably mounted upon an output platform movable by means of a first positioning system which in turn is mounted upon the intermediate output platform of a second positioning system which is arranged to move relative to a work surface located beneath said object, and holding means mounted on said platform for holding a component, comprising the steps of:

operating the second positioning system to move the first positioning system in mutually perpendicular directions to drive the first positioning system to a predetermined location;

determining if there is any misalignment between the component held by the holding means and the work surface; and operating the first positioning system responsive to detection of a misalignment of said components relative to the desired position on the working surface.

43. The method of claim 42 wherein the step of operating said first positioning system further comprises the step of:

selectively moving the first positioning system in mutually perpendicular directions and rotating said component to correct for misalignment.

44. The method of claim 43 further comprising the steps of determining the instantaneous position of the output platform and operating said two-dimensional positioning means according to the detected position.

45. The method of claim 42 further comprising the step of operating the holding means to precisely place the component upon the working surface.

* * * * *

UNITED STATES PATENT AND TRADEMARK OFFICE
CERTIFICATE OF CORRECTION

PATENT NO. : 5,126,648
DATED : June 30, 1992
INVENTOR(S) : Jacobs

It is certified that error appears in the above-identified patent and that said Letters Patent is hereby corrected as shown below:

Column 3, line 18, before "robot" insert --A--

Column 9, line 50, change "integral" to --movable--

Column 10, line 19, change "70" to --70'--

Column 10, line 21, delete "o"

Column 12, line 16, delete first occurrence of "first"

Column 12, line 19, change "grooves" to --groove--

Column 17, line 3, after "along" insert --a--

Column 17, line 20, after "along" insert --a--

Signed and Sealed this

Seventh Day of September, 1993

Attest:

BRUCE LEHMAN

Attesting Officer   Commissioner of Patents and Trademarks